United States Patent [19]

Young et al.

[11] Patent Number: 4,872,144

[45] Date of Patent: Oct. 3, 1989

[54] ENDFIRE SEISMIC RECEIVER AND METHOD OF USE

[75] Inventors: Dewey R. Young, Houston; Richard E. Duren, Spring, both of Tex.

[73] Assignee: Exxon Production Research Company, Houston, Tex.

[21] Appl. No.: 265,418

[22] Filed: Oct. 31, 1988

[51] Int. Cl.[4] .......................... G01V 1/00; G01V 1/20
[52] U.S. Cl. .......................... 367/20; 367/53; 367/57; 367/154; 181/112
[58] Field of Search .......................... 181/108, 110, 112; 367/21, 53, 56, 57, 58, 65, 106, 130, 153, 154, 20

[56] References Cited

U.S. PATENT DOCUMENTS

| | | | |
|---|---|---|---|
| 3,460,064 | 8/1969 | Giles et al. | 340/7 R |
| 3,489,994 | 1/1970 | Massa | 367/153 |
| 3,746,122 | 7/1973 | Davis | 340/7 R |
| 3,838,390 | 9/1974 | Michon | 340/15.5 MC |
| 3,852,708 | 12/1974 | Doolittle et al. | 340/7 R |
| 3,882,444 | 5/1975 | Robertson | 181/110 |
| 3,890,593 | 6/1975 | Davis | 340/15.5 MC |
| 3,906,352 | 9/1975 | Parker | 340/7 R |
| 3,934,220 | 1/1976 | Davis | 340/15.5 MC |
| 4,064,479 | 12/1977 | Ruehle | 181/110 |
| 4,131,873 | 12/1978 | Anderson | 367/129 |
| 4,146,870 | 3/1979 | Ruehle | 340/7 R |
| 4,254,480 | 3/1981 | French | 367/58 |
| 4,403,312 | 9/1983 | Thomason | 367/56 |
| 4,644,508 | 2/1987 | Zachariadis | 367/24 |

OTHER PUBLICATIONS

Microwave Scanning Antennas, vol. II, Array Theory and Practice, Edited by R. C. Hansen, 1966, Academic Press, New York and London, pp. 23-35.
Fields and Waves in Communication Electronics, Simon Ramo, et al., 1965, John Wiley & Sons, Inc., New York, London and Sydney, pp. 688-689.
Microwave Antenna Theory and Design, Edited by Samuel Silver, 1965 Dover Publications, Inc., pp. 257-279.

*Primary Examiner*—Brian S. Steinberger
*Attorney, Agent, or Firm*—Vaden, Eickenrohr, Thompson & Boulware

[57] ABSTRACT

An endfire seismic array comprises one or more marine seismic cables having a plurality of acoustic-to-electrical hydrophone receivers spaced therealong, each being operatively connected in combination so that as a unit an endfire receiving beam pattern with respect to any frequency across the seismic band is formed by causing the signals from the individual hydrophone receivers to be additive for that frequency. A plurality of cables results in a more narrow beam than a single cable. A geologic or lithologic formation that is a dip change from the norm may be detected either as an extra strong increase or decrease in signal, depending on the mode of use.

11 Claims, 6 Drawing Sheets

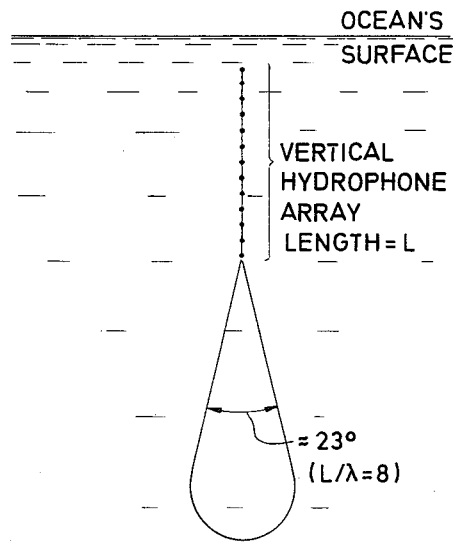
FIG.5A
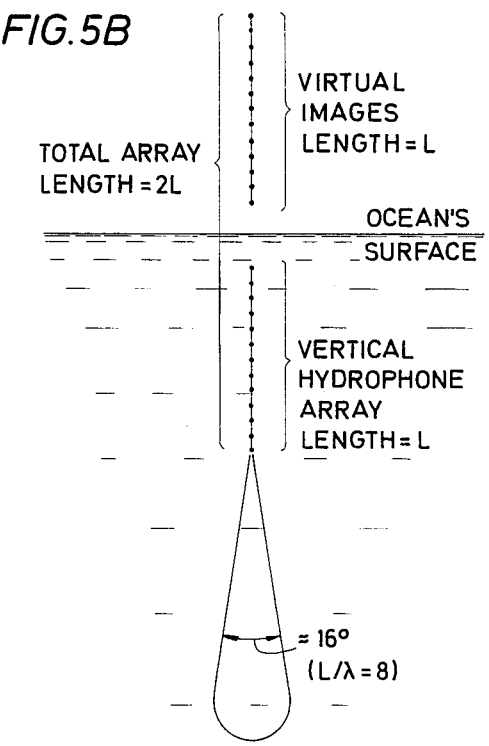
FIG.5B
INCREASING LENGTH BY 2, DECREASES BEAMWIDTH BY A FACTOR OF $1/\sqrt{2}$
FIG.6A
TOP VIEW
20m 20n 20o 20p
20i 20j 20k 20l
20e 20f 20g 20h
20a 20b 20c 20d
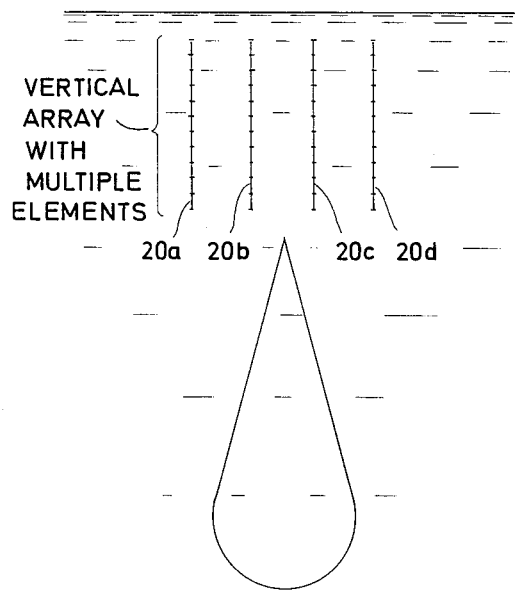
FIG.6B

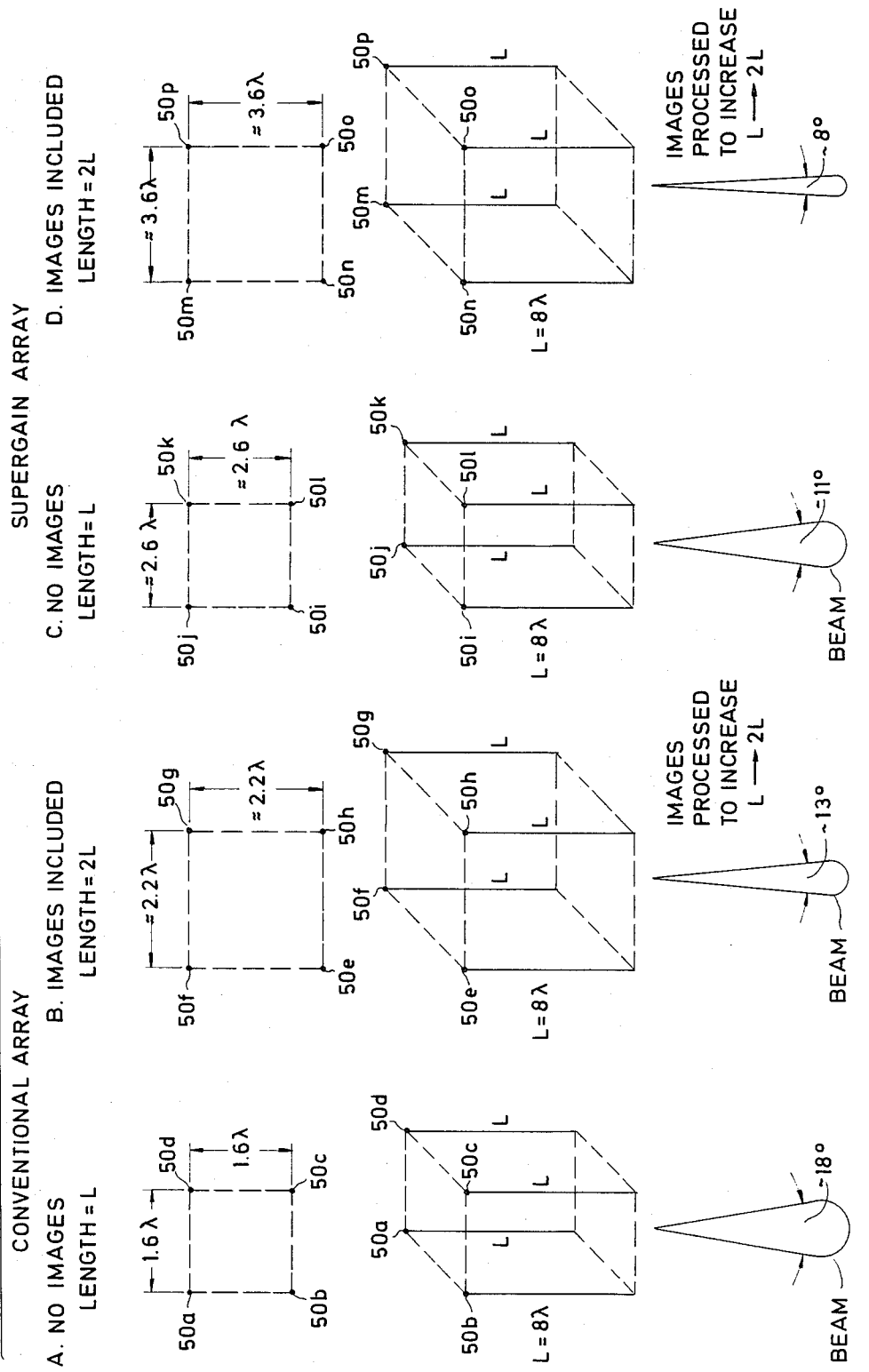

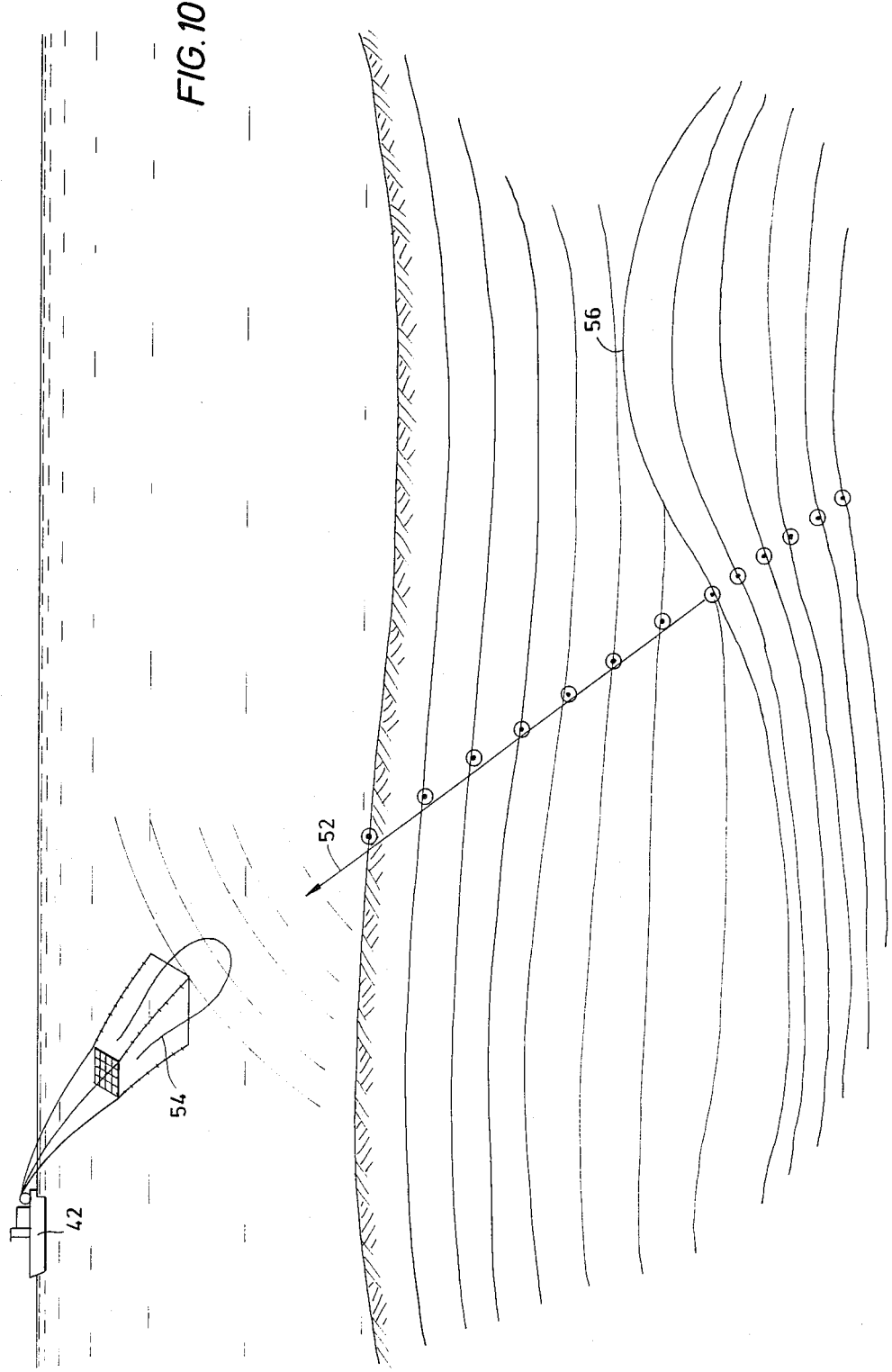

ENDFIRE SEISMIC RECEIVER AND METHOD OF USE

BACKGROUND OF THE INVENTION

1. Field of the Invention

This invention pertains to apparatus and method useful in developing information regarding geological formations and in particular in developing information in a deep marine environment utilizing a unique technique applied to seismic surveying that is based on the direction of the returned seismic reflections.

2. Description of the Prior Art

Marine seismic data acquisition techniques in current use are evolutionary techniques derived from techniques employed for developing 2-D marine seismic surveys. Such surveys are developed by a seismic vessel equipped with a seismic source and one or more seismic cables, sometimes referred to as streamers. A seismic cable is commonly on the order of two miles long and includes a plurality of pressure sensitive hydrophones spaced along its length. Individual hydrophone electrical outputs are often summed together forming arrays of the individual hydrophones. The arrays are often spaced at regular intervals, for example, every 15 meters, with the individual hydrophones also being regularly spaced. Conventionally a seismic source is positioned near the vessel and therefore also near the front end of the cable. The cable is ballasted to trail behind the vessel in a substantially horizontal plane and slightly beneath the surface of the water to avoid interference from surface wave action The receiving pattern for an array is the product of the element factor and the array factor The array factor has also been called the space factor It is the pattern of the array if the elements are isotropic. An individual hydrophone and its image (reflection off the sea's surface) form a dipole element. A typical hydrophone array will be more directional than a dipole (due to the array factor), but the array will still respond to returns over a wide angular range.

The seismic source is typically one or more airguns, waterguns, or marine vibrators which radiate wideband acoustic signals into the water at periodic intervals to be reflected from the geologic formations below the water bottom. In a 2-D survey, reflections from the formations are received by the arrays along the cable, routed to the vessel, and recorded for data processing. Each time the source radiates, a trace of seismic data is developed for each array. A seismic record is the total result of all the traces for a particular shot. Records of data are developed for an entire area of interest as the vessel traverses subsequent parallel paths at regular intervals, usually on the order of about one-half kilometer spacing.

3-D marine seismic surveys have been developed in a fashion similar to that described above for 2-D. However, there can be several receiver cables or streamers towed at once, possibly by more than one vessel. There are typically 240 arrays per cable and, therefore, for the two streamers shown in the prior art diagram shown in FIG. 1, for each shot occurrence there are 480 seismic traces. Since a shot occurs every few seconds, the resulting accumulation of seismic data from such a survey to be subsequently processed is enormous and extremely expensive. Furthermore, if the formations of survey interest are generally known through previous surveys or other information, much of the data collected by the above technique is noisy or complex. Note again from FIG. 1 that vessel 10 is off to one side of formation 12. The example source emanation 14 resulting in reflection 16 is useful. Subsurface lines 18 will contribute only when the vessel's track passes over structure 12. However, many of the other reflections that occur contemporaneously therewith do not reflect off the target of interest, formation 12. Nevertheless, the procedure utilized most frequently is the technique generally described above.

In antenna art it is known that transmitting antennas can be made to emit directional radiation. One such recognized technique that has been employed for this purpose is the "endfire" technique described for microwave antennas for example, in *Microwave Scanning Antennas*, Volume II, Array Theory and Practice, edited by R. C. Hansen, Academic Press, 1966, which is incorporated herein by reference. An endfire beam generally results from a linear array of individual elements. The array produces a tear-drop transmitting pattern from an end of the linear array.

The pattern's beamwidth is normally defined as the angular separation between directions at which the radiated power density is down to one-half its maximum value, and an endfire beam is very directional or narrow and is sometimes referred to as a "pencil beam" as opposed to a "fan beam" for a linear array at broadside. A "fan beam" only has a beamwidth for one angular coordinate, while a pencil beam is symmetrical about an axis along the array. Pencil beams whose half-power widths are in the region from about 15 degrees to 35 degrees can be produced quite readily by endfire arrays that have lengths ranging from 3–8 wavelengths. For endfire arrays the length of the array L varies inversely with the square of the beamwidth $\theta_B(\theta_B{}^2 \alpha 1/L)$ while the broadside beamwidth varies inversely with L.

Narrow pencil beams require very long arrays. By forming a composite array having individual endfire arrays as elements, a composite endfire beam can be made even more narrow.

Since the transmitting and receiving patterns of an array are identical through reciprocity, it is possible to build receiving arrays having the narrow pencil beams normally associated with endfire arrays Therefore, it is a feature of the present invention to provide improved marine seismic data collection results utilizing seismic cable orientation that is generally vertical for pencil beam formation, rather than generally horizontal as employed in the prior art.

Another feature of the present invention is to provide improved seismic receiving arrays, in the form of "endfire" seismic receiving arrays covering the seismic frequency band, suitable for developing seismic data pertinent to a geologic formation having a generally predetermined location.

Another feature of this invention is to provide for the improved use of endfire arrays as the elements of an array comprised of endfire elements.

Yet another feature of this invention is to provide for the improved utilization of images above the ocean surface to effectively increase the length of the endfire array. The images can effectively double the length of a vertical cable.

Still another feature of the present invention is to provide improved direct placement of anticlinal structures in seismic data in a straightforward manner utilizing a pencil beam.

SUMMARY OF THE INVENTION

The invention endfire seismic receiving array generally comprises at least one marine able having spaced along its length pressure-sensitive hydrophones that convert acoustical energy into electrical signals, a means for orienting the cable so that it is generally vertical, and means for receiving and recording the electrical signals. Endfire reception is accomplished by correctly phasing and summing the hydrophone outputs. This may be accomplished in real time, near real time or later as a data processing step. At near vertical the array can effectively be doubled in length by including the images within the array. Physically, this amounts to simply using the upgoing and downgoing seismic signals when forming the array. Upgoing seismic signals will travel up the cable at the water velocity. However, downgoing seismic signals travel across the hydrophones with a velocity that varies inversely with the cosine of twice the angle off vertical. As the angle increases, this must be taken into account when the images are included as part of the array.

A cable is oriented nearly vertical when employed in conjunction with surveying a mostly horizontal geologic formation. A source located near the top of the cable or cables produces downwardly directed energy that results in reflection signal returning to the pencil beam pattern of the receiving array. As the source and cable are advanced with respect to the ocean bottom and subsequent shots result in additional reflections, it becomes readily apparent when a shot fails to result in a strong reflected signal that the formation may have undergone a change in dip since the reflection is no longer within the pencil beam.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary preferred embodiments thereof which are illustrated in the drawings, which form a part of this specification. It is to be noted, however, that the appended drawings illustrate only typical preferred embodiments of the invention and are not to be considered limiting of its scope as the invention may admit to other equally effective embodiments.

Figure 1:
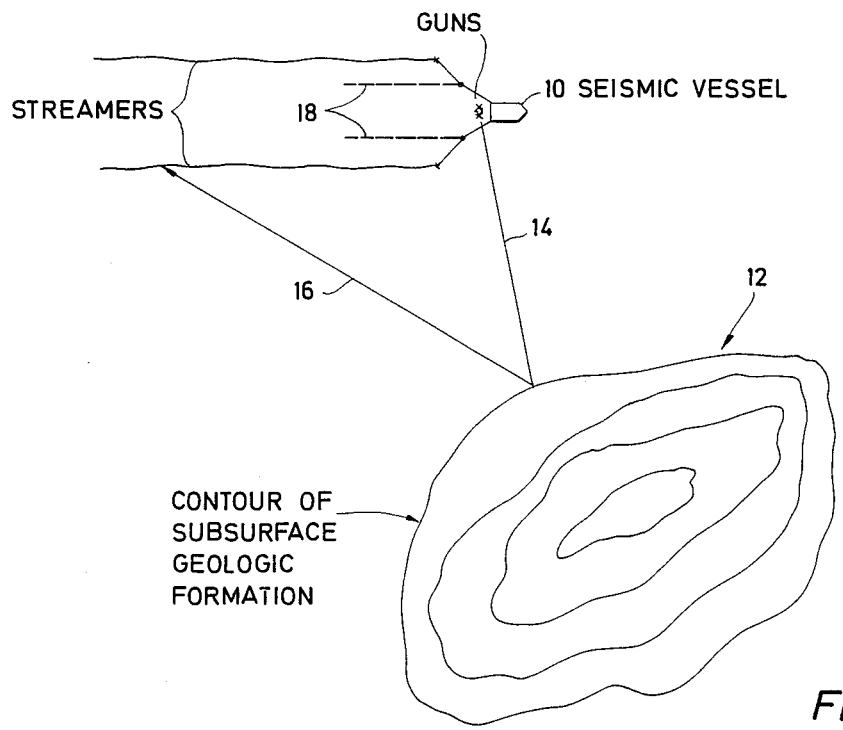

IN THE DRAWINGS:

FIG. 1 is a plan view of a prior art method of performing a 3-D marine seismic survey with respect to a generally known geologic formation. The hydrophones are used to recover the full frequency content of the returned seismic reflections.

Figure 2:
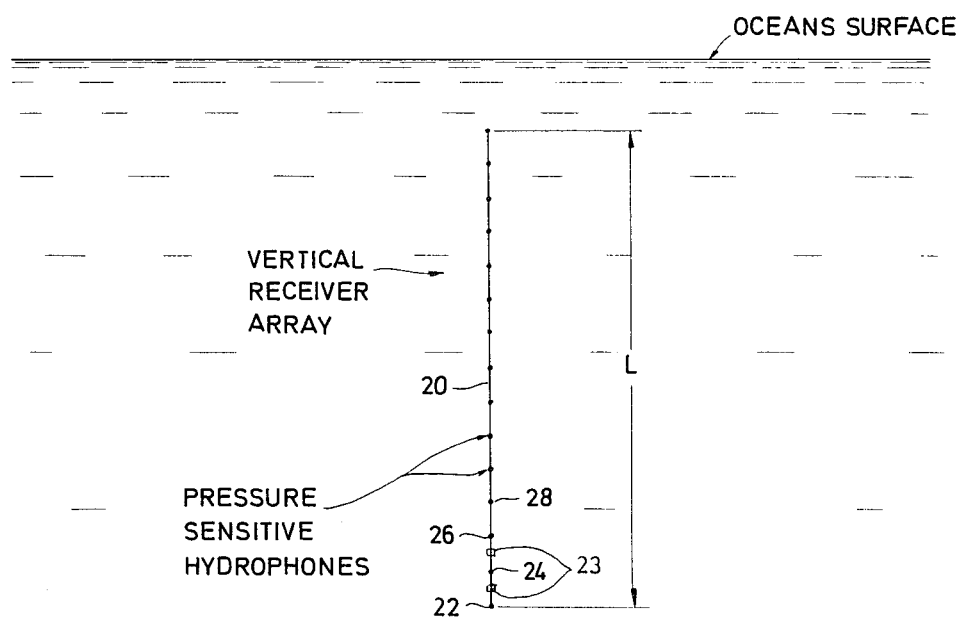

FIG. 2 is a side view of a first embodiment of an improved endfire seismic receiving array of length L in accordance with the present invention.

Figure 3:
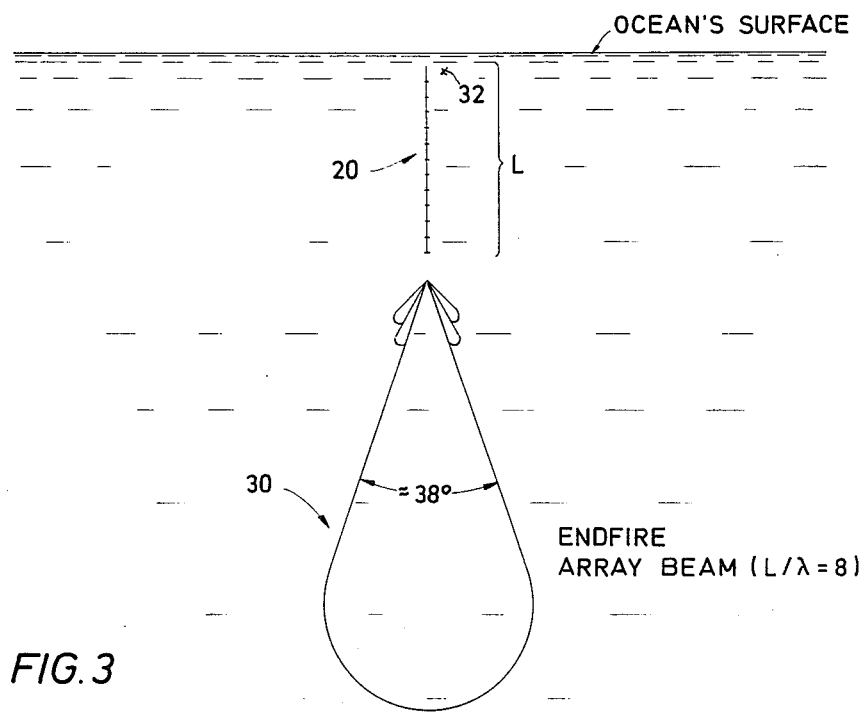

FIG. 3 is a side view of the embodiment shown in FIG. 2 with an illustration of an endfire beamwidth when $L/\lambda = 8$ where $\lambda$ is wavelength.

Figure 4:
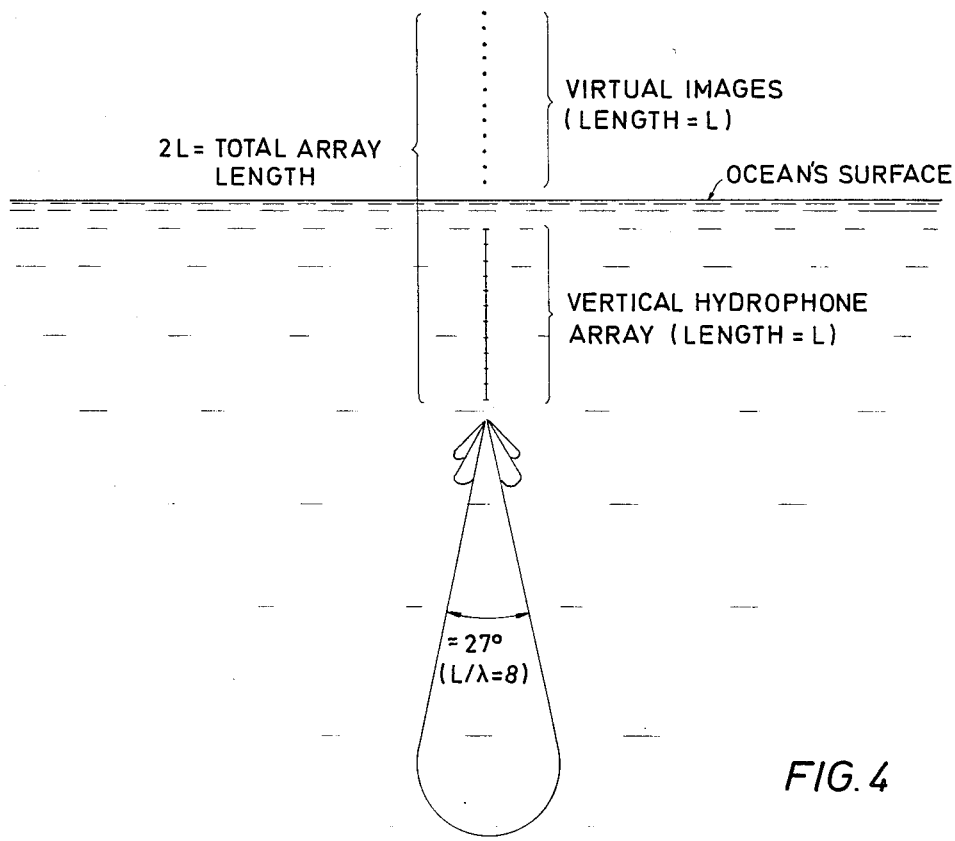

FIG. 4 shows the beamwidth for a conventional endfire array of length L along with the images above the ocean's surface. By properly processing the collected seismic data to include the images, the array can effectively be doubled. This roughly reduces the beamwidth by $1/\sqrt{2}$.

Even smaller beams are possible through "supergaining". There are limits, but a small amount of supergaining is practical.

FIGS. 5A and 5B show beamwidth for receiving endfire arrays with supergain, thereby illustrating a 60% reduction in beamwidth compared with the beamwidth for a conventional endfire array. This reduction is consistent with a Hansen-Woodyard supergained array.

FIGS. 6A and 6B show parallel cables $20a$-$20p$ forming an array of endfire array elements. This arrangement can show some beamwidth reduction. However, the array factor's pattern is expected to be too broad for closely spaced cables unless a very large array of endfire elements is used. When the length and width of the array approach L, beamwidth reductions will occur. This difficulty is overcome with an embodiment shown in FIGS. 7A–7D.

FIGS. 7A–7D are respective top view and plan view of another embodiment of an improved endfire seismic receiving array in accordance with the present invention. This embodiment roughly establishes an "interferometer" pattern for the array factor due to the distantly spaced endfire cables. Only the central lobe is retained as the element pattern suppresses all other interferometer lobes. The resulting beamwidth is that of the interferometer and is less than that of an individual endfire element.

Figure 8:
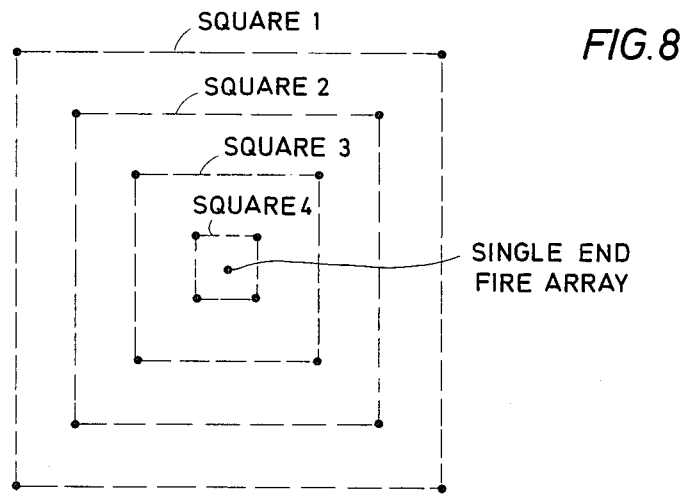

FIG. 8 shows yet another embodiment of an improved endfire seismic receiving array. In this embodiment several square arrays are used to cover the seismic band. Each square covers a particular frequency band.

Figure 9:
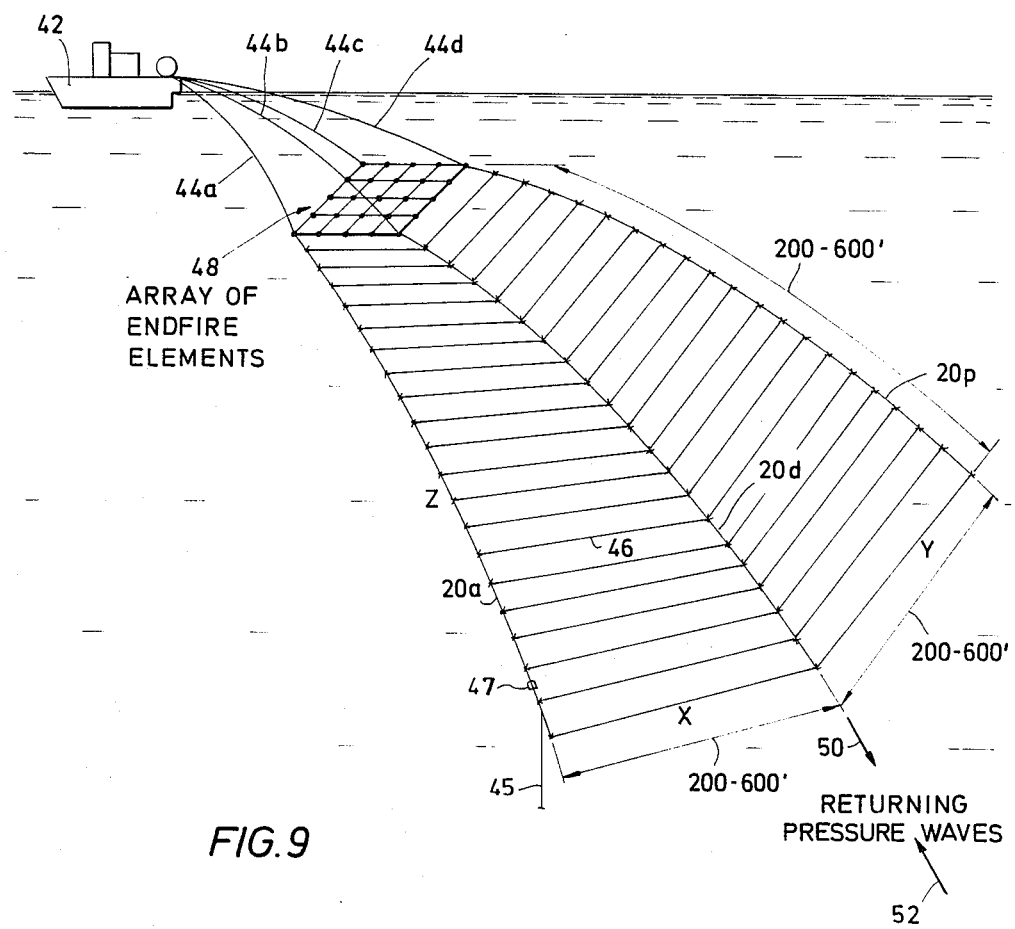

FIG. 9 is a perspective view of an embodiment of a directional source and receiving array in accordance with the present invention.

FIG. 10 is a perspective view of the receiving endfire array in accordance with FIG. 9 in conjunction with surveying an illustrative geologic formation.

DESCRIPTION OF THE PREFERRED EMBODIMENTS

Now referring to the drawings, and first to FIG. 2, the side view of a preferred embodiment of a single-cable endfire receiving array 20 is shown having physical length L that is typically about 2000 feet (approximately 840 meters). The front end of the cable is connected to a vessel (not shown) in conventional fashion. Hydrophones 22, 24, 26, 28, etc. are spaced along cable 20 in a fashion similar to that employed with traditional, horizontally deployed marine seismic cables. Each hydrophone 22, 24, 26, 28, etc. is an individual pressure sensitive hydrophone acting to function in a manner well-known in the art. The cable is weighted with weights 23, or at least non-ballasted for horizontal orientation, so that it will deploy in a roughly vertical direction, as shown. Alternatively, it can be controllably ballasted so that it can be directed or oriented toward a specific target, which may not be directly underneath the beamed end of the cable.

FIG. 3 illustrates a 38 degree beamwidth when wavelength $\lambda = L/8$ is sensed by cable 20.

FIG. 4 shows the enhanced received beam pattern when the virtual images are used to effectively double the receiver array length. There is an image corresponding to each individual hydrophone at a location above the ocean's surface equal in distance to the hydrophone's depth below the ocean's surface. The total effective array length, including images, is equal 2L, L being the length of the cable. The beamwidth reduces by a factor of $1/\sqrt{}$ when the array length doubles. The resulting beam is reduced from 38 degrees as per FIG. 3 to 27 degrees.

FIGS. 5A–5B show a 60% beamwidth reduction achieved by supergaining consistent with Hansen-Woodyard supergaining. Hansen-Woodyard beamwidth values are 60% of the beamwidth of a conventional endfire array. This increased directivity result is accompanied by increased sidelobe levels. This may be undesirable for some applications. For higher frequencies, the beam width is even narrower, as shown by the following table:

| | Approximate Beamwidth (Degrees) | | | |
|---|---|---|---|---|
| | Conventional Array | | Supergain Array | |
| L/λ | Array (L) | Array (2L) | Array (L) | Array (2L) |
| 8 | 38.0° | 27.0° | 23.0° | 16° |
| 12 | 31.0 | 22.0 | 19.0 | 13.0 |
| 16 | 27.0 | 19.0 | 16.0 | 11.0 |
| 20 | 24.0 | 17.0 | 15.0 | 10.0 |
| 24 | 22.0 | 16.0 | 13.0 | 9.3 |
| 28 | 20.0 | 14.0 | 12.0 | 8.6 |
| 32 | 19.0 | 14.0 | 11.0 | 8 |
| 36 | 18.0 | 13.0 | 11.0 | 7.6 |
| 40 | 17.0 | 12.0 | 10.0 | 7.0 |

With supergain, $L/\lambda = 16$, and the images included, the reception beamwidth is about 11 degrees. All seismic frequencies are recorded and processed to construct the returned seismic signals.

Each hydrophone along the cable is an acoustic-to-electrical transducer that results in a separate electrical signal up the cable to a data recorder and/or processor located on the vessel to which the cable is connected. Recorded or stored data is generally processed via a computer or a processor at any subsequent convenient time, on board or elsewhere. Signals from broadside to the array, or from elsewhere out of the endfire beam, are diminished with respect to the detection of signals occurring in a direction within the pencil beam.

The pattern that has been described with respect to a single cable can be made even more directional or narrower by employing additional parallel cables in a pattern such as shown in FIGS. 6A and 6B.

It is convenient to analyze a grouping of four individual cables 50a–50p, as shown in FIGS. 7A–7D. In FIG. 7A–7D, four identical cables are employed, the cables being arranged from the top view in a 2×2 grid. The cables are assumed to be substantially parallel. For 1.6λ, 2.2λ, 2.6λ, and 3.6λ spacing shown, the beamwidths are shown where $L/\lambda = 8$. Individual endfire elements can remain broadband.

FIG. 8 shows the top view of several arrays of the type shown in FIG. 7. Each square array can cover a different portion of the seismic band with a single element in the center. The outer array is for the lowest frequency. The other square arrays cover higher frequency bands. The number of squares is determined by the bandwidth covered by each square array and the bandwidth of the seismic signal. A single endfire array at the center can receive all the higher frequencies.

An implementation of a narrow beam endfire receiving array in accordance with the above-described structure is illustrated in FIGS. 9 and 10. Vessel 42 tows a cable structure similar to that shown in FIG. 8 by way of cable tow lines 44a–44d. Each of these lines is also the extension of the cables for signal communication of the cables with respect to the vessel. Only three of the most visible corner cables of the matrix of cables are shown, namely, cables 20a, 20d and 20p. The receiver cables are connected by lines 46, which do not need to be cable communication lines, at frequent enough intervals so as to keep the cable matrix in tack. In the illustration, lines 46 are shown connected to the respective cables at the points where the individual hydrophones receivers are located, but that is not necessary. For illustration purposes, the cable lengths are 200–600 feet (61–183 meters) and the cable separation is likewise 200–600 feet (61–183 meters), thereby forming a cube of receiver networks in the respective X, Y, and Z directions, as shown.

Located at or near the top end of the receiver cable array is a source array 48 of individual airguns in the illustration. This source array directs seismic energy in a direction down through the cable array in a direction 50 to be reflected and returned in a direction 52 toward the receiving array. It should be noted that directions 50 and 52 are not necessarily vertical, but they are in a direction compatible with the receiving beam.

Now referring to FIG. 10, the structure of FIG. 9 is shown with respect to a geologic formation comprising a plurality of interfaces producing seismic reflections along a line generally referred to as direction line 52. The cable receiver array causes a receiving beam pattern 54. Thus it will be seen that returning reflections from interfaces more shallow than interface 56 will be returned to the surface outside of beam pattern 54. The reflection from surface 56, however, will be in the beam pattern. Deeper interface surfaces will again cause reflections outside of the beam pattern. Hence, it can be seen that a change of dip from the normal terrain pattern will result in this case, in a strong return and thereby be discernible.

Another method of use is to adjust or orient the cable receiver so that its beam pattern is normal to the generally prevailing terrain, which in the case of FIG. 9. Hence, when encountering no dip as the cable receiver network is moved with respect to the geologic formation, there is a strong signal within beam pattern 54. However, when a dip change is encountered, the reflection from the formation interface will not be within the beam pattern and, hence, an absence of signal return in this case, suggesting significant dip change.

Although the normal employment of the cable array is to develop a beam response along an axis that is parallel with the cables, this is not completely necessary. What this means is that the cable array can be made to "scan" its beam for the presence or absence of a strong return without moving the entire array.

Although the orienting of the cable or cables in an array has been suggested as being done by weighting and ballasting, orientation may also be achieved by appropriate mooring. An example of a mooring line 45 is shown in FIG. 9. Fairings can also be provided to the cable or cables to provide resistance from movement caused by towing. A fairing 47 is shown schematically in FIG. 9. For an actual cable, fairings are located at multiple locations along its length, as is well-known in the art.

The recording of data gathered using the highly directive receiving array eliminates the necessity for heavy data processing currently required, and the development of the data reduces or substantially eliminates the need for CDP processing, stacking and migration while developing largely relevant data.

While several embodiments have been described and illustrated it will be understood that the invention is not limited thereto, since many modifications may be made and will become apparent to those skilled in the art.

What is claimed is:

1. An endfire seismic array, comprising
   a marine cable with a plurality of hydrophones spaced along the length of said cable,
   means for orienting said cable in a substantially axial direction toward a seismic target irradiated by seismic radiation from a seismic source, said plurality of hydrophones receiving respective seismic reflections caused by target irradiation at time intervals dependent of their respective axial distances from the target, said hydrophones converting said respective received acoustic energy to corresponding respective electrical signals, and
   means for respectively phasing said respective electrical signals so that the phased electrical signals are additive, thereby producing pencil beams for frequencies across the seismic band.

2. An endfire seismic array in accordance with claim 1, wherein each of said plurality of hydrophones and each hydrophone's image are used when forming the endfire array, phasing means for the signals and image signals to effectively increase up to twice the length of the array and causing reduction in the endfire beamwidth.

3. An endfire seismic array in accordance with claim 1, wherein reductions of up to about 60% are obtained in the beamwidth.

4. An endfire seismic array in accordance with claim 2, wherein reductions of up to about 60% are obtained in the beamwidth.

5. An endfire seismic array in accordance with claim 1, 2, 3, or 4, wherein said orienting means includes weights for causing said cable to depend away from horizontal.

6. An endfire seismic array in accordance with claim 1, 2, 3, or 4, wherein said orienting means includes fairings to provide said cable with resistance from motion caused by towing.

7. An endfire seismic array in accordance with claim 1, 2, 3, or 4, wherein said orienting means includes mooring lines connected to said cable.

8. An endfire receiving array in accordance with claim 1, 2, 3, or 4, wherein each receiving element is itself an endfire array, and where the spacing between endfire elements is chosen to further reduce the overall endfire beamwidth.

9. An endfire seismic array in accordance with claim 8, comprising
   a plurality of marine cables, each of said cables comprising a plurality of pressure sensitive acoustic hydrophone receivers spaced at intervals along their respective lengths of cable,
   said plurality of cables being regularly or irregularly spaced, and
   means for orienting said cables toward a seismic target irradiated by acoustic radiation from a seismic source so that a plurality of groups of receivers are axially directed toward the target,
   said plurality of receivers in each group receiving respective seismic reflections caused by target irradiation at time intervals dependent on their respective axial distances from the target,
   said receivers converting said respective received seismic reflections to corresponding respective electrical signals, and
   means for respectively phasing said respective electrical signals so that the electrical signals are additive, thereby producing a pencil beam receiver.

10. An endfire seismic array in accordance with claim 9, wherein each hydrophone receiver includes more than one acoustical receiving element.

11. The method of developing seismic data from detecting a change in dip present in a regular seismic formation, which comprises
    orienting an endfire seismic receiver normal to the regular seismic formation,
    orienting a seismic source adjacent said receiver for irradiating the regular seismic formation, said receiver receiving seismic reflection radiations caused by irradiations from said seismic source in a pencil beam pattern, and
    moving said receiver and said source with respect to the formation while measuring said radiations received by said receiver, a discontinuity in receiving reflection radiations indicating the presence of a change in dip in the regular seismic formation.

* * * * *